United States Patent
Sasazawa et al.

(10) Patent No.: US 7,084,990 B2
(45) Date of Patent: Aug. 1, 2006

(54) METHOD AND ITS APPARATUS FOR MEASURING SIZE AND SHAPE OF FINE PATTERNS

(75) Inventors: Hideaki Sasazawa, Yokohama (JP); Tohishiko Nakata, Hiratsuka (JP); Masahiro Watanabe, Yokohama (JP); Shunichi Matsumoto, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 328 days.

(21) Appl. No.: 10/372,270

(22) Filed: Feb. 25, 2003

(65) Prior Publication Data
US 2003/0223087 A1 Dec. 4, 2003

(30) Foreign Application Priority Data
May 29, 2002 (JP) ............................. 2002-156103

(51) Int. Cl.
*G01B 11/03* (2006.01)
(52) U.S. Cl. ....................................... 356/636
(58) Field of Classification Search ................ 356/636; 430/5, 22, 30
See application file for complete search history.

(56) References Cited

U.S. PATENT DOCUMENTS

| 6,642,063 B1 * | 11/2003 | Mundt et al. ............... 356/300 |
| 6,778,268 B1 * | 8/2004 | Singh et al. ................ 356/448 |
| 2003/0015660 A1 * | 1/2003 | Shishido et al. ............ 250/311 |
| 2003/0048458 A1 * | 3/2003 | Mieher et al. .............. 356/601 |
| 2003/0121022 A1 * | 6/2003 | Yoshitake et al. ........... 716/21 |

* cited by examiner

*Primary Examiner*—Hwa (Andrew) Lee
*Assistant Examiner*—Kara Geisel
(74) *Attorney, Agent, or Firm*—Antonelli, Terry, Stout and Kraus, LLP.

(57) ABSTRACT

In size measurement of a semiconductor device, profiles of a pattern formed in a resist process are determined through an exposure/development simulation in respect of individual different combinations of exposure values and focus values to form a profile matrix and scattered light intensity distributions corresponding to the individual profiles are determined through calculation to form a scattered light library, thereby forming a profile library consisting of the profile matrix and scattered light library. A scattered light intensity distribution of an actually measured pattern is compared with the scattered light intensity distributions of the scattered light library and a profile of profile matrix corresponding to a scattered light intensity distribution of scattered light library having the highest coincidence is determined as a three-dimensional shape of the actually measured pattern.

12 Claims, 7 Drawing Sheets

METHOD AND ITS APPARATUS FOR MEASURING SIZE AND SHAPE OF FINE PATTERNS

BACKGROUND OF THE INVENTION

The present invention relates to method and apparatus for measuring size and three-dimensional shape (hereinafter simply referred to as shape) of fine patterns and more particularly, to method and apparatus suitable for measurement of the size and shape of fine patterns formed in, for example, semiconductor devices such as semiconductor memory and integrated operation circuit.

For measurement of the width of a fine pattern formed in the semiconductor device, a technique based on a measuring SEM (scanning electron microscope) has been known, according to which an electron beam is irradiated on a target or object pattern and secondary electrons and reflected electrons generated from the pattern are detected to use intensity of detection signals. In the measuring SEM, however, observation is made from above the measuring object, so that a fine width of the object pattern can be measured but a three-dimensional shape including height of the object pattern cannot be measured. In the past, for measurement of the three-dimensional shape, a method has generally been employed in which a target portion of circuit pattern in a semiconductor device formed on a semiconductor wafer is either cut or shaved with an FIB and a resulting section is observed with an electron microscope, for instance.

But, the measurement based on the measuring SEM or section observation as above faces problems that the throughput is decreased as compared to that obtained through optical measurement based on, for example, a microscope and the measuring apparatus is complicated and costly.

Meanwhile, to eliminate the problems as above, a method called scatterometry has been proposed, according to which an optical measuring method is used to measure size and shape of fine patterns in a non-contact and nondestructive fashion. This method is described in the specification of, for example, U.S. Pat. No. 5,867,276. To describe this method in brief, reference is made to FIG. 2 showing the general construction of a spectroscopic measuring apparatus.

In the figure, an incandescent light beam from an incandescent light source 3 is passed through an objective lens 4 so as to be irradiated, as incident light beam 5, onto a measuring point 10 on a semiconductor wafer 1. The incident light beam 5 is irradiated at a specified incident angle onto the semiconductor wafer 1 and a reflected light beam 6 at a reflection angle optically symmetrical to the incident angle is condensed by a condenser lens 7 and received at a light receiver 8. The received light beam from the light receiver 8 is spectroscopically analyzed by means of a spectroscope 9 so that reflection intensity at the measuring point 10 may be measured in relation to individual wavelengths.

The semiconductor wafer 1 representing a measuring object is mounted on a stage 2 movable in X, Y and Z directions and rotational direction (θ). Therefore, the light beam can be irradiated at a desired spot on the wafer 1 by moving the stage 2 in X, Y and Z directions and spectrum waveforms at different angles θ to the same measuring point can be detected.

FIG. 3 shows graphically results of measurement of spectra distribution 11 by means of the apparatus constructed as above and in the figure, abscissa represents the wavelength and ordinate represents the measured intensity of reflected light.

Incidentally, when semiconductor chips 12 are arranged on the semiconductor wafer 1 as shown in FIG. 4A, for instance, it is general to provide a chip main part or proper 13 and scribe regions 14 and 15 in the semiconductor chip 12 as shown in FIG. 4B. Formed in the chip proper 13 are fine patterns (actual patterns) of semiconductor device such as semiconductor memory and integrated operation circuit and disposed in the scribe regions 14 and 15 are patterns (test patterns) for testing fabricated through the same process as the actual patterns. After the semiconductor wafer 1 is completed and individual semiconductor chips 12 are diced, the scribe regions 14 and 15 used for measurement of patterns are removed from the semiconductor chip 12 by dicing.

An example of a test pattern in each of the scribe regions 14 and 15 in FIG. 4B is illustrated in perspective view form in FIG. 5.

The pattern shown in the figure is exemplified as a pattern generally called line and space in which structurally, a linear pattern line 16L and a space portion 16S are arranged alternately.

In the previously-described scatterometry method, the test pattern as above is handled as an object and when a plurality of modeled pattern shapes (model patterns) are assumed, a scattered light intensity distribution practically detected by using the optical measuring apparatus as shown in FIG. 2 is compared with scattered light intensity distributions for individual model patterns obtained through an optical simulation, whereby a model pattern for which the both types of scattered light intensity distributions coincide with each other is determined as a shape of the test pattern representing the object to be measured.

For example, when the line and space as shown in FIG. 5 is determined as a measuring object pattern, a model pattern (profile) 17 of sectional (three-dimensional) shape as shown in FIG. 6 is set up or established. This model pattern 17 consists of a line portion 18 and a space portion 19 and for example, top width Wt, intermediate width Wm, bottom width Wb, top shoulder roundness Rt, bottom angle Ab and height Hc are set as shape parameters of this measuring target pattern.

Then, by determining upper and lower limits and step values of the individual parameters and setting a plurality of values, which differ stepwise in accordance with the step values between the upper and lower limits, in respect of the individual parameters, model patterns 17 corresponding to all combinations of the parameter set values are assumed and scattered light intensity distribution as shown in FIG. 3 is determined through calculation in respect of each model pattern 17 so as to be recorded as a library for use in the comparison described so far.

As will be seen from the above, the scatterometry method is basically for optical measurement and therefore, has advantages that the measuring apparatus is simpler and cheaper than the SEM measurement and besides the throughput is higher.

But, on the other hand, because of the fact that uniform repetitive patterns of about 50 μm square are needed as measuring target patterns in order to maintain quantities of light sufficient for detection and a huge number of model pattern shapes need be generated on a computer and scattered light intensity distribution for each model pattern must be calculated by the computer in order to obtain highly accurate measurement results, there arises a problem at present that the model pattern shapes and their scattered light intensity distributions can be generated within practically acceptable time in connection with only the patterns of linear line and space shape as shown in FIG. 5.

SUMMARY OF THE INVENTION

The present invention intends to eliminate the conventional problems as above and it is an object of this invention to provide method and apparatus adapted to measure size and shape of fine patterns on a semiconductor wafer and being capable of measuring size of two-dimensionally distributed patterns and three-dimensional shape, including patterns of arbitrary shapes and hole patterns which constitute fine patterns in the semiconductor device, within a short period of time by using practically effective profiles.

More specifically, according to the invention, in a method for measuring size and shape of fine patterns by irradiating a light beam onto a fine pattern on a semiconductor wafer and using a scattered light beam from the pattern, the measurement is carried out by using information indicative of changes in shape of the fine pattern attributable to its fabrication process.

Also, according to the invention, in a method for measuring size and shape of fine patterns by irradiating a light beam onto a fine pattern on a semiconductor wafer and using a scattered light beam from the pattern, changes in shape of the fine pattern attributable to its fabrication process are determined through a simulation to predict scattered light intensity distributions in respect of the individual changes in shape of the fine pattern and measurement is carried out by comparing the predicted scattered light intensity distributions with a scattered light intensity distribution detected from the actually formed fine pattern.

Further, according to the invention, an apparatus for measuring size and shape of fine patterns on a semiconductor wafer comprises:

illumination means for irradiating a light beam onto a fine pattern on a semiconductor wafer;

detection means for detecting a reflected light beam from the fine pattern;

incoming/outgoing angle change means for changing an incident angle of the incident light beam to the fine pattern and a reflection angle of the reflected light beam corresponding to the incident angle by continuously shifting an illumination angle of the illumination means and a detection angle of the detection means;

measurement means for measuring an intensity distribution of the reflected light beam in relation to the incident angle;

model generation means for generating model patterns of three-dimensional shape of the fine pattern on the basis of design data of the fine pattern and a predictable shape of the fine pattern;

calculation means for calculating reflected light intensity distributions obtained by the measurement means in respect of individual model patterns of the fine pattern;

comparison/decision means for comparing the reflected light intensity distribution detected by the measurement means with the reflected light intensity distributions calculated by the calculation means to select a model pattern having the highest coincidence;

output means for delivering sizes of desired parameters of a three-dimensional shape of the actually measured fine pattern from the model pattern selected by the comparison/decision means; and display means for displaying a distribution of the sizes on the semiconductor wafer on the basis of the output from the output means.

These and other objects, features and advantages of the invention will be apparent from the following more particular description of preferred embodiments of the invention, as illustrated in the accompanying drawings.

DESCRIPTION OF THE EMBODIMENTS

Firstly, a resist pattern on semiconductor wafer representing a measuring object will be described.

In the resist pattern to be formed in an exposure/development process of semiconductor device fabrication, the shape of a formed pattern changes to a great extent depending on the difference in exposure amount and the difference in focus in an exposure unit as well known in the art.

Accordingly, in order to assure a pattern shape meeting design values, semiconductor chips having patterns respectively formed by slightly changing each of the exposure amount and focus value are precedently arranged in matrix in the same semiconductor wafer and an optimum combination of exposure amount and focus value leading to a pattern shape best fitted to the design is determined by measuring the respective pattern shapes.

As a measuring method to this end, the previously-described scatterometry can be used as will be described below.

Figure 7:
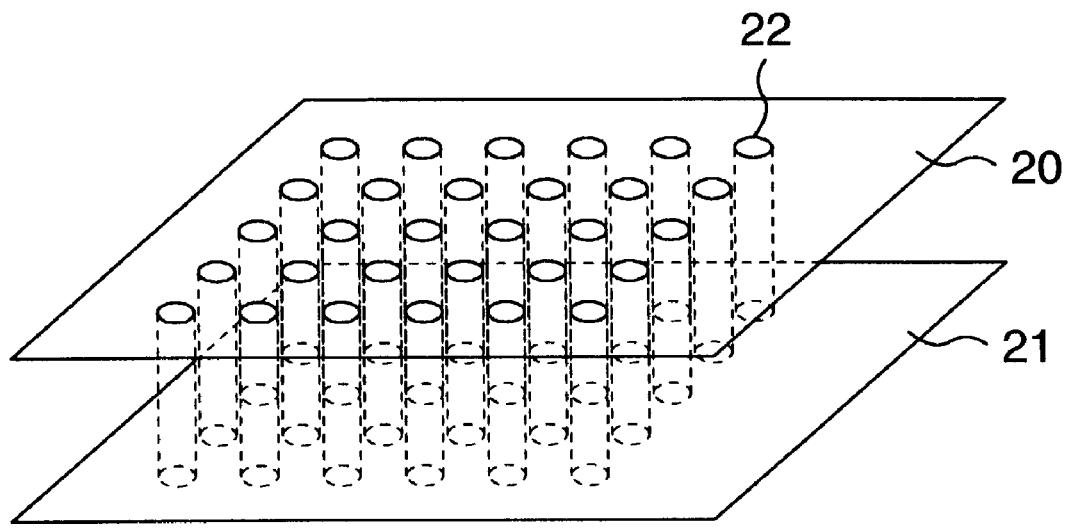
FIG. 7 is a diagrammatic perspective view showing an example of a pattern of successive via-holes.

For example, when considering an example of a hole pattern called via-hole shown in FIG. 7 as a resist pattern, the pattern has a top layer 20, a bottom layer 21 and a hole 22 connecting them.

Figure 8:
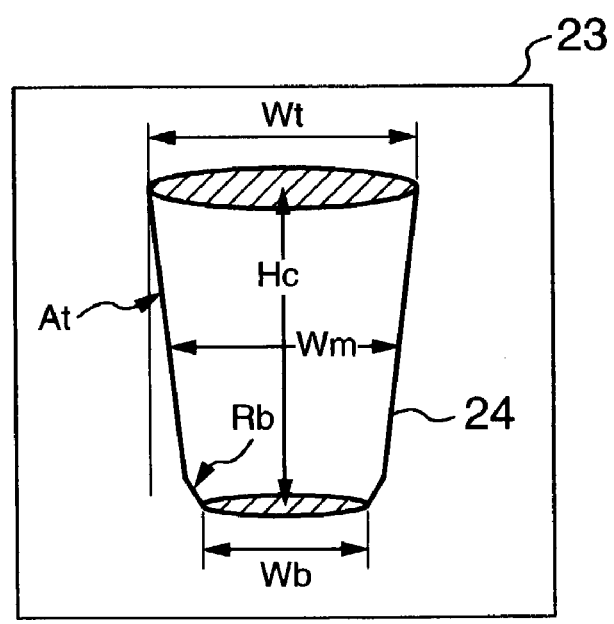
FIG. 8 is a diagram diagrammatically showing an example of a model pattern of the via-hole pattern.

When this pattern is modeled with the aim of using the aforementioned conventional scatterometry for measurement of size and shape of the hole 22, there results a model pattern 23 as shown in FIG. 8. This model pattern 23 depicts a sectional (three-dimensional) shape (profile) 24 of the hole.

In the model pattern 23, top hole width Wt, intermediate hole width Wm, bottom hole width Wb, bottom roundness Rb, top angle At and depth Hc, for instance, can be considered as parameters of the shape.

In case about 50 values at intervals of predetermined step values used in general measurement are set to each parameter and all combinations of values of these parameters are formed in matrix for the purpose of obtaining highly accurate measurement results, the combinations of values of these parameters result in the profiles, respectively, and nearly 1,000,000 profiles are needed as set forth so far. Then, when scattered light intensity distributions of the individual profiles are calculated through the scattered light simulation by using a general 10-CPU parallel computer, calculation time amounting up to about 150,000 hours (=17 years) is required, thus impairing practicability.

Contrarily, by using the optical simulation, the calculation of the pattern shapes in resist corresponding to the differences in parameters represented by the exposure amount and focus value can be assured and the present invention is based on this feature. Embodiments of the invention will now be described with reference to the accompanying drawings.

Figure 1:
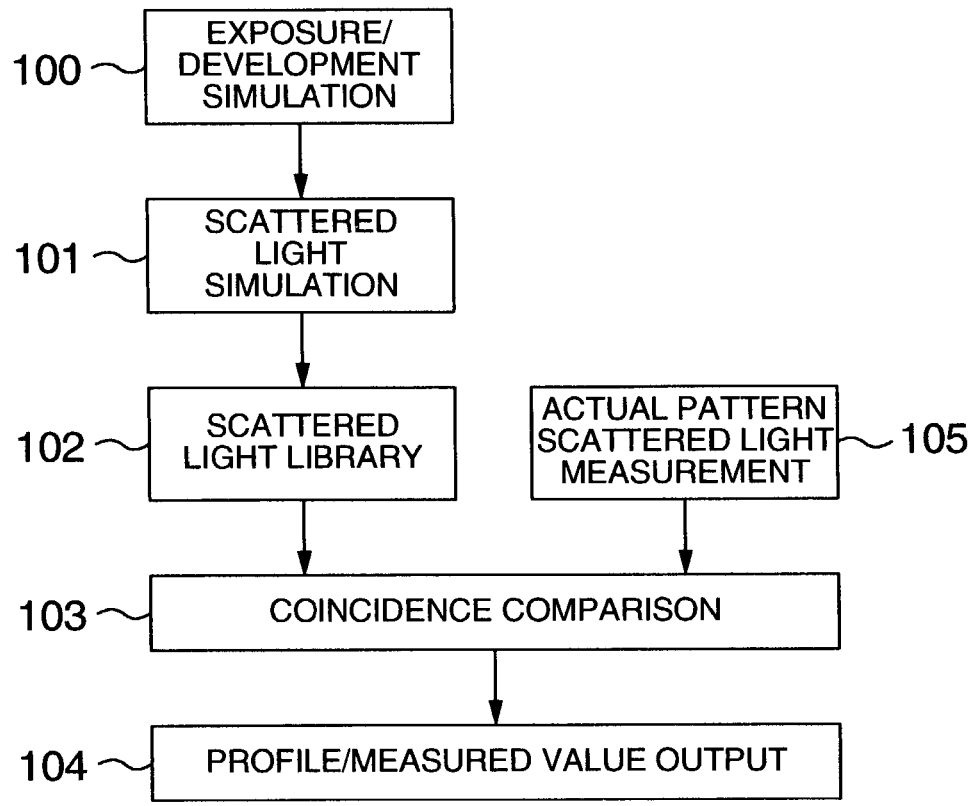
FIG. 1 is a flowchart showing a first embodiment of a method for measuring size and shape of fine patterns on semiconductor wafer according to the invention.

Referring to FIG. 1, there is illustrated a flowchart showing a first embodiment of a method for measuring size and shape of fine patterns on semiconductor wafer according to the invention.

In the figure, characteristics of resist in which a pattern representing a measuring object is formed and optical conditions of an exposure unit are first determined and a known exposure/development simulation is applied to the measuring object pattern (step 100). In the exposure/development simulation, a plurality of exposure amounts which differ stepwise by a predetermined step value and a plurality of focus values which also differ stepwise by a predetermined step value are set (they are set by taking the differences actually occurring in the fabrication of the semiconductor wafer into consideration), all combinations of the set exposure amounts and focus values are determined and three-dimensional shapes (profiles) of model patterns in resist, which are formed under the conditions of the combinations of exposure amounts and focus values, are determined by means of a computer in respect of the individual combinations to establish a matrix of profiles corresponding to all of the combinations (profile matrix). For example, in case 10 exposure amounts and 10 focus values are set and a profile matrix consisting of 100 profiles corresponding to the total of combinations is established, time required for the establishment is about one to several hours with the general 10-CPU parallel computer used.

Figure 9A:
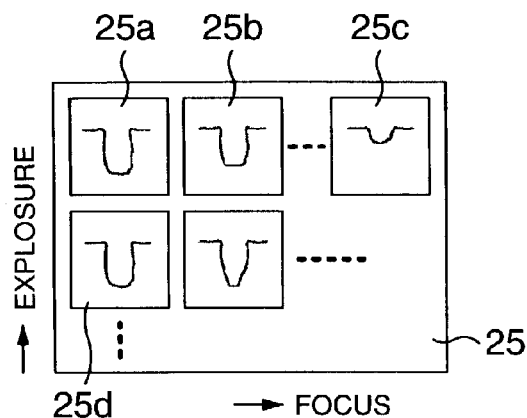
FIGS. 9A and 9B are diagrams showing a specific example of a scattered light library formed in the first embodiment shown in FIG. 1.

FIG. 9A diagrammatically shows such a profile matrix 25 as above. As illustrated, the profile matrix has elements of profiles 25a, 25b, 25c, 25d, . . . corresponding to different combinations of the exposure amounts and focus values. For example, the profile 25a is a profile corresponding to exposure amount Ea and focus value Fa and the profile 25b is a profile corresponding to exposure amount Eb and focus value Fb.

Reverting to FIG. 1, scattered light intensity distributions are subsequently calculated through a known scattered light simulation (step 101) in respect of the individual resist model patterns (profiles 25a, 25b, 25c, 25d . . . ) of the profile matrix 25 formed in the aforementioned exposure/development simulation (step 100) to establish a scattered light library (102).

Figure 9B:
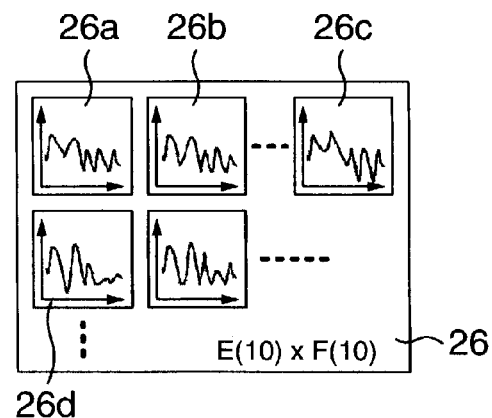

FIG. 9B shows diagrammatically such a scattered light library 26 as above. The scattered light library 26 has elements of scattered light intensity distributions 26a, 26b, 26c, 26d, . . . corresponding to the profiles 25a, 25b, 25c, 25d, . . . , respectively, in the profile matrix 25 (FIG. 9A). Accordingly, one-to-one correspondence is made between the respective scattered light intensity distributions 26a, 26b, 26c, 26d, . . . and the respective profiles 25a, 25b, 25c, 25d, . . . of the profile matrix 25 (FIG. 9A) and for example, the scattered light intensity distribution 26a is that of the profile 25a and the scattered light intensity distribution 26b is that of the profile 25b.

Then, the profile matrix 25 and scattered light library 26 constitute a profile library. The thus established profile library contains information indicative of changes in shape of an actual pattern generated in compliance with differences in the exposure amount and focus value in the fabrication process of the fine pattern (actual pattern) on the semiconductor wafer.

Figure 4A:
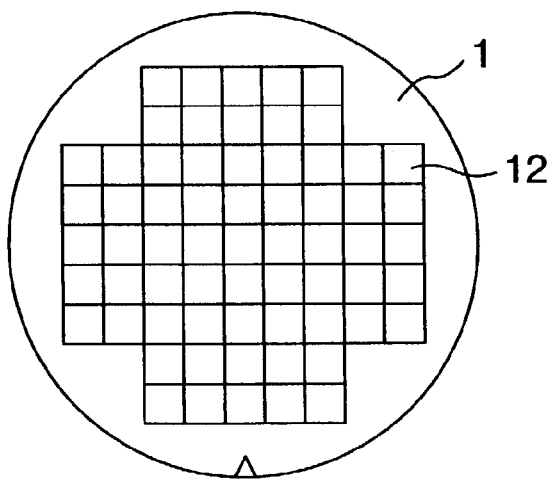
FIGS. 4A and 4B are diagrams showing diagrammatically the construction of a semiconductor wafer and that of a semiconductor chip formed on the wafer, respectively.
Figure 5:
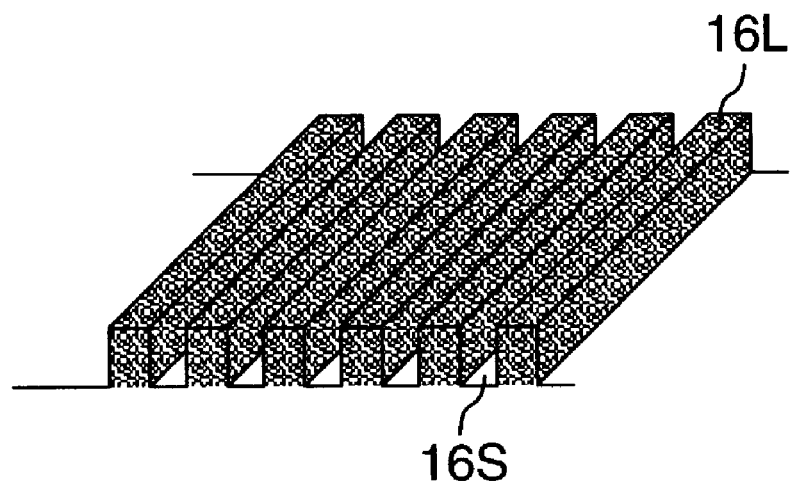
FIG. 5 is a perspective view showing an example of a line and space pattern in a scribe region in the semiconductor chip shown in FIG. 4B.
Figure 6:
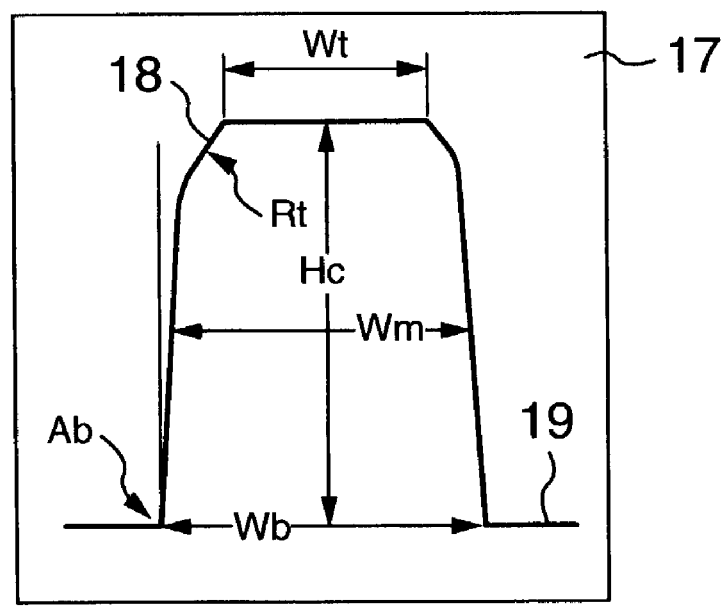
FIG. 6 is a diagram showing diagrammatically an example of a model pattern of the line and space pattern shown in FIG. 5.

In the step 101, the scattered light intensity distribution can be calculated not only for the above consecutive hole patterns but also for the line and space as well as an isolated pattern. Therefore, in the case of the semiconductor wafer 1 as shown in FIG. 4A, a scattered light library 26 can be established through the scattered light simulation in respect of not only the test pattern shown in FIG. 5 and representing the scribe regions 14 and 15 but also an arbitrary actual pattern of resist in the chip proper 13. Then, time required for establishing the scattered light library 26 of, for example, 100 model patterns of resist is about 15 to several of tens hours with the aforementioned 10-CPU parallel computer used, thereby permitting the measurement to be done within practical time as compared to the conventional method in which the profile is directly modeled.

Figure 2:
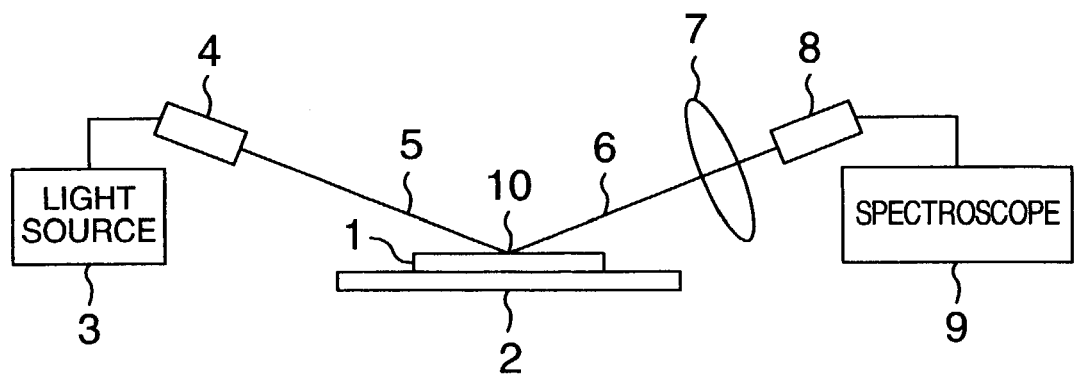
FIG. 2 is a schematic diagram showing a first embodiment of a measuring apparatus according to the invention having the same construction as a conventional apparatus.
Figure 3:
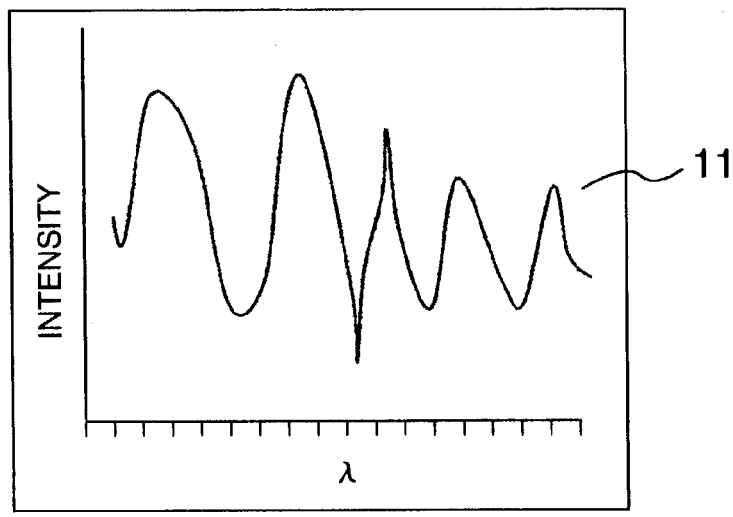
FIG. 3 is a graphic representation showing a scattered light intensity distribution detected by the measuring apparatus shown in FIG. 2.
Figure 4B:
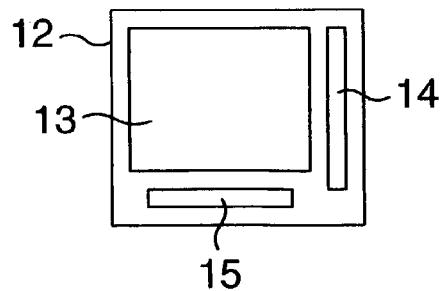

Reverting to FIG. 1, the profile library (profile matrix 25+scattered light library 26) is established in advance in this manner. Then, an optical measuring apparatus having the same construction as that of the optical measuring apparatus shown in FIG. 2 is used as the first embodiment of the measuring apparatus according to the invention and for example, the semiconductor wafer 1 having actual patterns of semiconductor device formed in the chip proper 13 as shown in FIG. 4B is used as a measuring object. Then, scattered light distributions of actual patterns of the same type in the chip main parts 13 of individual semiconductor chips 12 are measured and measurement results 105 are compared, at individual measuring points, with the scattered light intensity distributions 26a, 26b, 26c, 26d, . . . corresponding to this actual pattern and stored in the scattered light library 26 of profile library shown in FIGS. 9A and 9B to decide a scattered light intensity distribution of the highest coincidence (step 103). As a method for coincidence comparison in the step 103, least squares errors comparison of scattered intensities at individual wavelengths, for instance, may be used.

With the scattered light intensity distribution of the highest coincidence among those in the scattered light library 26 determined, a profile in profile matrix 25 corresponding to that scattered light intensity distribution is determined as a three-dimensional shape of the actual pattern at these measuring points.

In this manner, the three-dimensional shape of the actual pattern at each measuring point on the semiconductor wafer 1 can be obtained in the form of the profile as a result of the aforementioned comparison process and the measurement result is delivered (step 104).

Figure 10:
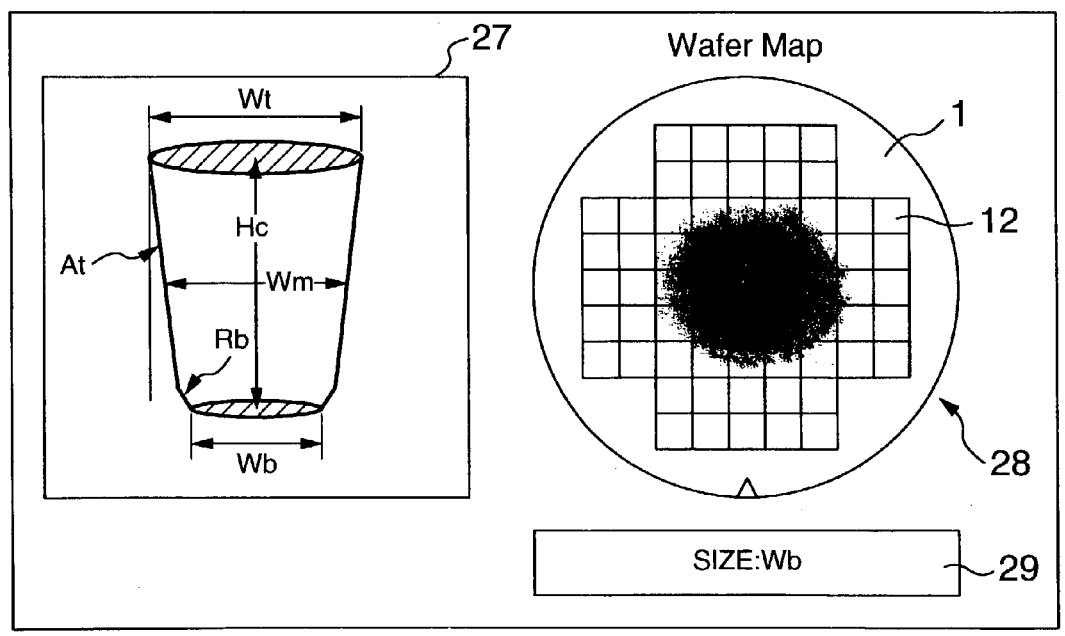
FIG. 10 is a diagram showing diagrammatically an example of display of measurement results obtained in the first embodiment shown in FIG. 1.

When the pattern representing a measuring object is a hole pattern, the measurement results are displayed, as shown in FIG. 10, on the screen of a personal computer (PC).

Displayed on the screen in the figure are individual parameters of a profile, that is, a profile picture 27 showing top hole width Wt, intermediate hole width Wm, bottom hole width Wb, bottom roundness Rb, top angle At and depth Hc, a wafer picture 28 indicative of the semiconductor wafer 1 provided with semiconductor chips 12 and a parameter designator 29 for designating a parameter.

When the user designates, for example, a model pattern of a hole among kinds of model patterns, a profile of a hole model pattern is displayed, along with its parameters, at the profile picture 27 on the PC screen. Then, one of the parameters is designated, the designated parameter is displayed at the parameter designator 29 and an indication corresponding to a measurement result is displayed on each measuring point on the semiconductor wafer 1 displayed at the wafer picture 28.

According to the above measurement, at each measuring point on the semiconductor wafer 1, a profile meeting the hole model pattern at each measuring point is caused to respond. For example, when a parameter of bottom hole width Wb is designated, the bottom hole width Wb in a profile corresponding to each measuring point is selected and a display (for example, a display conforming to a difference from a design value) is made at, for example, each predetermined area of the semiconductor chip 12 in accordance with a value of the selected parameter (here, bottom hole width Wb) at each predetermined area. In a display method, density or color, for example, is changed.

In this manner, distribution/dispersion of size and three-dimensional shape of the actual resist pattern formed in the exposure/development process of semiconductor fabrication can be grasped easily over the whole of the semiconductor wafer 1. The contents of the display shown in FIG. 10 indicates that the distribution disperses between the central part and peripheral part of the semiconductor wafer 1.

As described previously, in the exposure/development process, the semiconductor wafer is formed in advance in which patterns are formed by slightly changing the exposure amount and focus value in respect of the individual semiconductor chips and the optimum exposure amount and focus value are determined by using the semiconductor wafer as above. In using such a semiconductor wafer even in the present embodiment, scattered light intensity distributions are determined in respect of individual patterns of individual semiconductor chips on the semiconductor wafer, the thus determined scattered light intensity distributions are compared with scattered light intensity distributions of scattered light library in the profile library, respectively, to determine profiles suited to the individual patterns, and a combination of exposure amount and focus value of one of the determined profiles which is best fitted to design values of the pattern is determined, thus making it possible to obtain a combination of exposure amount and focus value optimized for formation of a pattern meeting the design.

Figure 11:
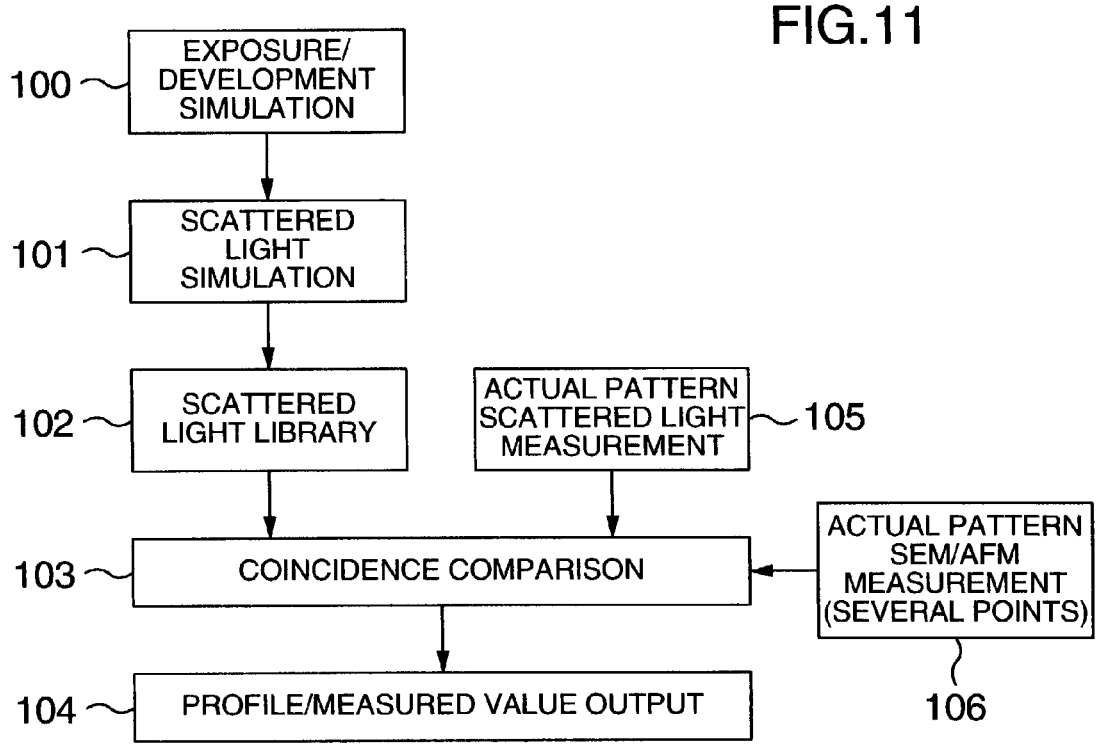
FIG. 11 is a flowchart showing a second embodiment of the method for measuring size and shape of fine patterns on semiconductor wafer according to the invention.

FIG. 11 is a flowchart showing a second embodiment of the method for measuring size and shape of fine patterns on semiconductor wafer according to the invention.

In the second embodiment, as shown in FIG. 11, a result of direct measurement of a profile of a pattern carried out with a profile SEM or AFM (atomic force microscope) (step 106) and a detection value of scattered light intensity distribution from the pattern are used as correction data in step 103 to improve the measurement accuracy. Excepting the above, the second embodiment is the same as the first embodiment shown in FIG. 1.

According to the present embodiment, in the event that for example, an offset occurs for some causes in the measurement result of scattered light intensity distribution of an actual pattern (step 105), a result of the measurement of actual pattern carried out by the profile SEM or AFM is used to correct data of the scattered light intensity distribution determined through simulation for the offset to make correction for permitting the scattered light intensity distribution data to correspond to the size and shape data of the pattern, thereby ensuring that the measurement accuracy can be improved.

Figure 12:
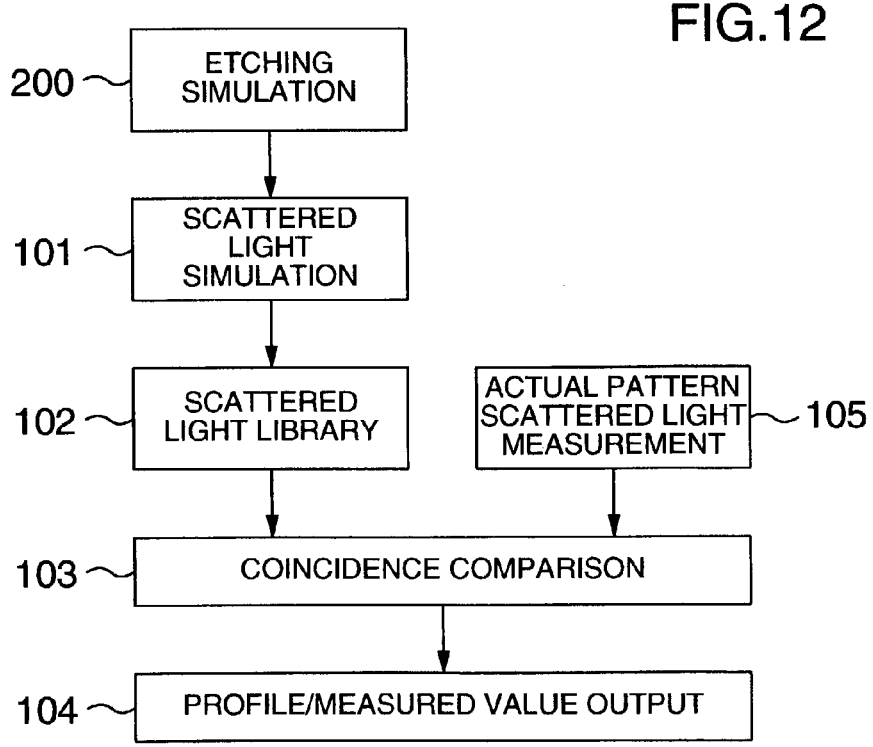
FIG. 12 is a flowchart showing a third embodiment of the method for measuring size and shape of fine patterns on semiconductor wafer according to the invention.

FIG. 12 is a flowchart showing a third embodiment of a method for measuring size and three-dimensional shape of fine patterns on a semiconductor wafer according to the invention.

In the third embodiment, the measuring object is not a resist pattern but is an etching pattern.

In FIG. 12, a shape matrix of a model pattern (profile matrix) is formed through an etching simulation substituting for the exposure/development simulation in FIG. 1 (step 200). Parameters in this case are, for example, the kind, flow rate and pressure of gas and reflected light intensities are determined through the simulation in respect of individual profiles in the profile matrix to form a reflected light library which is combined with the shape matrix (profile matrix) to form a profile library. The ensuing processing procedures (steps 101 to 105) are the same as those in the embodiment shown in FIG. 1. Obviously, like the second embodiment shown in FIG. 11, results of direct measurement of profile of the pattern by means of the profile SEM or AFM may be used as correction data in the coincidence comparison (step 103) to assure improvements in measurement accuracy.

Figure 13:
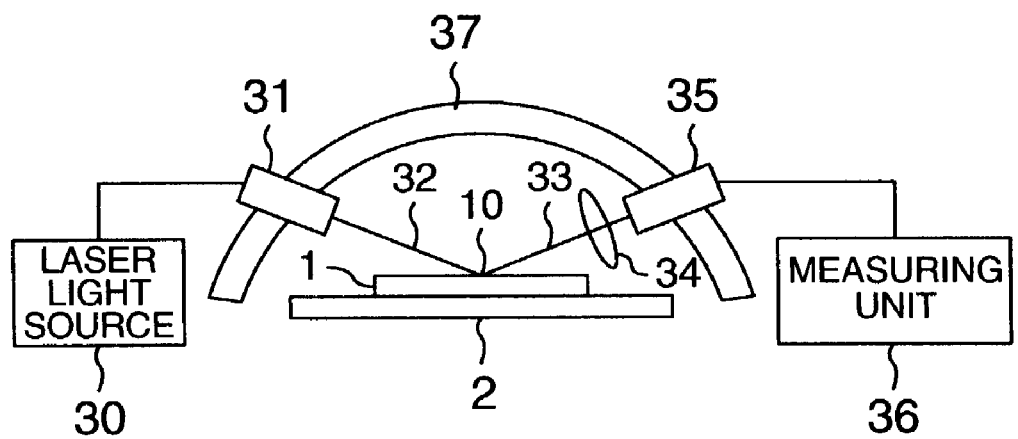
FIG. 13 is a schematic diagram showing the construction of a second embodiment of the measuring apparatus according to the invention.

FIG. 13 schematically shows the construction of a second embodiment of the measuring apparatus according to the invention. Reference numeral 30 designates a laser light source, 31 an objective lens, 32 an incident laser light beam, 33 a reflected laser light beam, 34 a condenser lens, 35 a light receiver, 36 a measuring unit and 37 incoming/outgoing angle change means. Similarly to FIG. 2, a semiconductor wafer, a stage and a measuring point are designated by reference numerals 1, 2 and 10, respectively.

In the figure, the laser light beam from the laser light source 30 is condensed by the objective lens 31 and irradiated, as incident laser light beam 32, onto the measuring point 10 on the semiconductor wafer 1. The reflected laser light beam 33 from the measuring point 10 is condensed by means of the condenser lens 34 disposed symmetrically to the objective lens 31 with respect to the measuring point 10 and received by means of the light receiver 35. The measuring unit 36 measures reflected light intensity distribution from the quantity of receiving light.

The objective lens 31 and the light receiver 35 provided with the condenser lens 34 are disposed on the incoming/outgoing angle change means 37. By changing the position of the objective lens 31 or changing the position of the light receiver 35 correspondingly by means of the incoming/outgoing angle change means 37, the incident laser beam 32 at a desired incident angle can be irradiated onto the same measuring point 10, thus permitting the measuring unit 36 to measure reflected light intensity distribution at the measuring point 10 in relation to the incident angle of the incident laser beam 32 while the incident angle of the incident laser beams 32 being changed.

Figure 14:
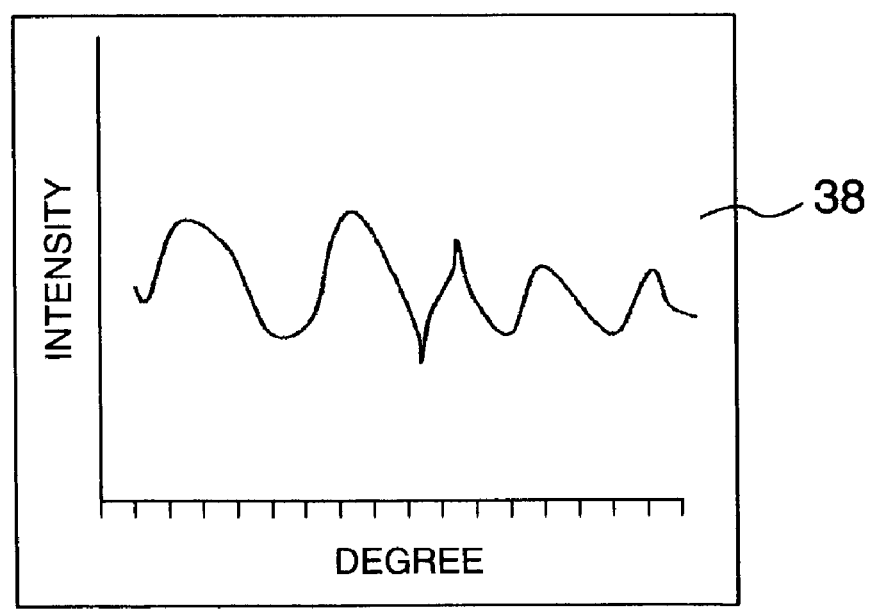
FIG. 14 is a graphic representation showing reflected light intensity distribution obtained with the measuring apparatus shown in FIG. 13.

The semiconductor wafer 1 representing a measuring object is mounted on the stage 2 and measurement at the measuring point 10 positioned arbitrarily can be assured. In this manner, with the construction in which reflected light beams from the measuring point 10 are detected in relation to arbitrary incident angles, reflected light intensity distribution 38 relative to the incident angle (degree) can be obtained as shown in FIG. 14 in respect of individual measuring points 10.

When predetermined patterns associated with different combinations of exposure amounts and focus values are provided in respect of the individual semiconductor chips 12 of semiconductor wafer 1 and they are defined as measuring points, reflected light intensity distributions 38 of scattered light can be obtained in respect of the individual semiconductor chips 12. Further, in respect of each of the profiles 25a, 25b, 25c, 25d, . . . of the profile matrix 25 shown in FIG. 9A, a scattered light library of reflected light intensity distribution 38 as shown in FIG. 14 can be prepared through the simulation in relation to a plurality of incident angles and the scattered light library can be used in combination with the previously-described measurement results to implement the embodiments of the methods shown in FIGS. 1, 11 and 12.

As described above, in the foregoing embodiments, the library of profiles formed by different combinations of the actual exposure amounts and focus values obtained through the simulation is used. Therefore, when a desired actual pattern is targeted, only profiles of the pattern actually caused to occur owing to differences in the exposure amount and focus value can be used for measurement, with the result that unnecessary profiles can be excluded and the library can be prepared within a short period of time. Further, distribution and dispersion of the size and three-dimensional shape of the pattern on the semiconductor wafer 1 can be measured and a combination of the exposure amount and focus optimized for the design values can be determined with high accuracy. This stands good for etching patterns.

It will be appreciated that in the foregoing embodiments the size and shape of a desired actual pattern can be measured and hence in the semiconductor wafer representing a measuring object, the scribe regions 14 and 15 for test pattern provided in the semiconductor chip as shown in FIG. 4B can be omitted.

As described above, according to the invention, the library of profiles based on practical conditions in the semiconductor fabrication is used and therefore, the profile library can be prepared within a very short period of time as compared to the conventional technique and the size and shape of an actual pattern of desired shape in the semiconductor device can be measured speedily and highly accurately without dicing the fabricated semiconductor wafer.

The foregoing embodiments have been described by way of example of the semiconductor device but the present invention can also be applied to measurement of the size and shape of patterns formed on a thin-film display substrate such as TFT (thin film transistor) substrate, PDP (plasma display panel) substrate and EL (electro-luminescence) substrate as well as measurement of the size and shape of a micro-machine formed on a substrate through a lithographic process.

The invention may be embodied in other specific forms without departing from the spirit or essential characteristics thereof. The present embodiment is therefore to be considered in all aspects as illustrative and not restrictive, the scope of the invention being indicated by the appended claims rather than by the foregoing description and all changes which come within the meaning and range of equivalency of the claims are therefore intended to be embraced therein.

What is claimed is:

1. A method for measuring size and shape of fine patterns comprising the steps of:
   determining sizes and shapes of patterns which are formed on a substrate by processing the substrate in a predetermined fabrication process, through a first simulation by making a correspondence with stepwise variations in conditions of said fabrication process;
   determining, through a second simulation, intensity distributions of scattered light generated when a light beam is irradiated onto said fine pattern having the sizes and shapes determined through said first simulation and corresponding to the stepwise variations in conditions of said fabrication process;
   irradiating the light beam onto said fine patterns formed on the substrate by processing said substrate in said predetermined fabrication process;
   detecting a light beam scattered from said fine pattern under the irradiation; and
   determining size and shape of said fine pattern formed on said substrate by using information of the scattered light intensity distribution obtained through the detection, data of the scattered light intensity distributions determined through said second simulation, and data of the size and shape of said fine patterns obtained through said first simulation.

2. A method for measuring size and shape of fine patterns according to claim 1, wherein
   said predetermined pattern fabrication process is an exposure/development process; and
   the first simulation is an exposure/development simulation of the exposure/development process.

3. A method for measuring size and shape of fine patterns according to claim 1, wherein:
   said predetermined pattern fabrication process is an etching process; and
   the first simulation is an etching simulation of said etching process.

4. A method for measuring size and shape of fine patterns according to claim 1, wherein data of size and shape of said fine patterns obtained by measuring the shape of said fine pattern formed on the substrate by processing said substrate through said predetermined fabrication process and data of an intensity distribution of scattered light from said fine pattern detected by irradiating the light beam onto said fine patterns are used as correction data when the size and shape of said fine patterns formed on said substrate are determined by using said information of the intensity distribution of scattered light obtained through the detection, said data of the intensity distributions of scattered light determined through said simulation and said data of the size and shape of said fine patterns.

5. A method for measuring size and shape of fine patterns according to claim 4, wherein the shape of said fine patterns formed on said substrate are measured by using an electron microscope or an atomic force microscope.

6. A method for measuring size and shape of fine patterns comprising the steps of:
- determining, through a simulation, data corresponding to sizes and shapes of fine patterns which are generated by stepwise variations in conditions of a fabrication process for formation of said fine patterns on a substrate;
- storing the data determined through said simulation;
- irradiating a light beam onto said fine patterns formed on said substrate in said fabrication process;
- detecting light beams scattered from said fine patterns under the irradiation; and
- determining sizes and shapes of said fine patterns formed on said substrate by using information indicative of a signal obtained by detecting the scattered light beam and said stored data.

7. A method for measuring size and shape of fine patterns according to claim 6, wherein the data determined through said simulation includes data of the size and shape of said fine pattern and data of scattered light beams generated from said fine pattern when the light beam is irradiated thereon.

8. A method for measuring size and shape of fine patterns according to claim 7, wherein said data of the size and shape of said fine pattern is data of sizes and shapes, obtained through the simulation, of said fine pattern which correspond to the individual fabrication conditions when the conditions of said fabrication process are changed in correspondence with said stepwise variations in the conditions.

9. A method for measuring size and shape of fine patterns according to claim 7, wherein said data of the scattered light beam generated from said fine pattern when said light beam is irradiated includes data representative of the scattered light beams, obtained through a second simulation, which are generated from said fine patterns when the light beam is irradiated onto said fine pattern having the sizes and shapes corresponding to the individual fabrication conditions and determined through said simulation.

10. A method for measuring size and shape of fine patterns according to claim 6, wherein said fine pattern fabrication process is an exposure/development process and said stepwise variations in the conditions are differences in exposure amount and focus in said exposure/development process.

11. A method for measuring size and shape of fine patterns according to claim 6, wherein said fine pattern fabrication process is an etching process and said stepwise variations in the conditions are changes in flow rate and pressure of gas in said etching process.

12. An apparatus for measuring size and shape of fine patterns comprising:
- illumination means for irradiating a light beam onto a fine pattern on a semiconductor wafer;
- detection means for detecting a reflected light beam from said fine pattern;
- incoming/outgoing angle change means for changing an incident angle of the incident light beam to said fine pattern and a reflection angle of the reflected light beam corresponding to the incident angle by continuously shifting an illumination angle of said illumination means and a detection angle of said detection means;
- measurement means for measuring an intensity distribution of the reflected light beam in relation to the incident angle;
- model generation means for generating model patterns of three-dimensional shape of said fine pattern on the basis of design data of said fine pattern and a predictable shape of said fine pattern;
- calculation means for calculating reflected light intensity distributions obtained from said measurement means in respect of individual model patterns of three-dimensional shape of said fine pattern;
- comparison/decision means for comparing the reflected light intensity distribution detected by said measurement means with the reflected light intensity distributions calculated by said calculation means to select a model pattern of three-dimensional shape having the highest coincidence;
- output means for delivering sizes of desired parameters of a three-dimensional shape of the actually measured fine pattern from the model pattern of three-dimensional shape selected by said comparison/decision means; and
- display means for displaying a distribution of the sizes on the semiconductor wafer on the basis of the output from said output means.

* * * * *